United States Patent [19]

Park

[11] Patent Number: 5,399,114

[45] Date of Patent: Mar. 21, 1995

[54] METHOD OF INJECTING LIQUID CRYSTAL FOR PRODUCING A LIQUID CRYSTAL DISPLAY PANEL

[75] Inventor: Seong B. Park, Seoul, Rep. of Korea

[73] Assignee: Goldstar Co., Ltd., Seoul, Rep. of Korea

[21] Appl. No.: 173,248

[22] Filed: Dec. 22, 1993

[30] Foreign Application Priority Data

Dec. 24, 1992 [KR] Rep. of Korea ............. P92-25517

[51] Int. Cl.$^6$ ............................................. G02F 1/13
[52] U.S. Cl. ............................................. 445/1; 141/7; 141/11
[58] Field of Search ................... 445/1; 141/7, 11

[56] References Cited

U.S. PATENT DOCUMENTS

| | | | |
|---|---|---|---|
| 4,099,550 | 7/1978 | Matsuzaki et al. | 141/7 X |
| 4,666,253 | 5/1987 | Yoshida | 359/75 |
| 4,681,404 | 7/1987 | Okada et al. | 359/79 X |

Primary Examiner—Kenneth J. Ramsey
Attorney, Agent, or Firm—Christie, Parker & Hale

[57] ABSTRACT

A method of injecting liquid crystal for producing a liquid crystal display panel, in which the liquid crystal is injected into a cell of an LCD panel after the liquid crystal is purified by adding ionic material captures for capturing ionic material which increases the contamination degree of the liquid crystal, into the liquid crystal contained in a liquid crystal tray having a contact coil formed at the upper part thereof. According to the method of the present invention, the specific resistivity of the liquid crystal is prevented being lowered down and the number of times of injecting the liquid crystal into a cell of an LCD panel is decreased because the contamination of the liquid crystal contained in the liquid crystal tray by ionic material in producing the LCD panel is restrained.

6 Claims, 1 Drawing Sheet

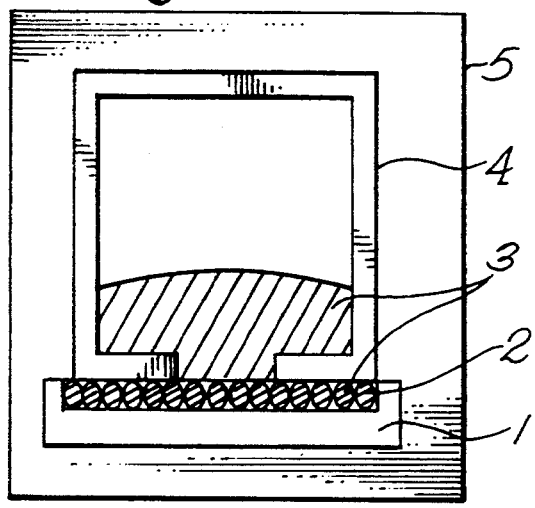
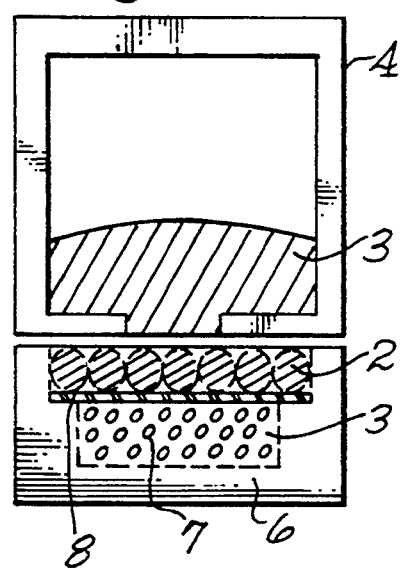
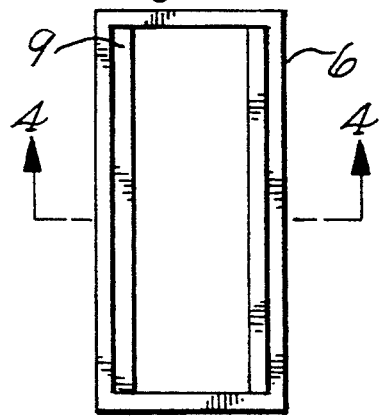
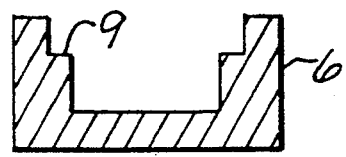
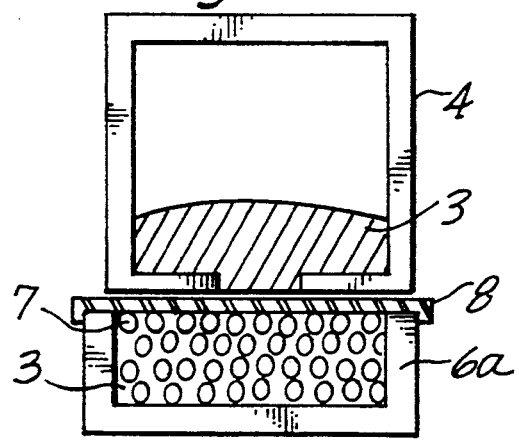

1

METHOD OF INJECTING LIQUID CRYSTAL FOR PRODUCING A LIQUID CRYSTAL DISPLAY PANEL

BACKGROUND OF THE INVENTION

1. Technical Field

The present invention relates to a method of injecting liquid crystal for producing a liquid crystal display (LCD) panel, and more particularly to a method of injecting a liquid crystal by which the contamination degree of a liquid crystal by an ionic material in producing an LCD panel can be decreased.

2. Prior Art

According to the conventional method of injecting liquid crystal for producing an LCD panel, if the interior of an injection chamber 5 and a cell 4 is exhausted to a vacuum and gas is leaked, liquid crystal 3 in a liquid crystal tray i is injected through a contact coil 2 to the interior of the cell 4 by the pressure difference.

However, according to the conventional method of injecting liquid crystal, the specific resistivity of the liquid crystal is lowered because the liquid crystal 3 is easily contaminated by the ionic material due to the successive reiterative injecting work in injecting the liquid crystal 3 in the liquid crystal tray 1 into the cell 4, thereby the performance of the LCD becomes worse and the process of injecting liquid crystal becomes complicated because the contaminated liquid crystal must be exchanged with new uncontaminated liquid crystal frequently.

SUMMARY OF THE INVENTION

It is an object of the present invention to provide a method of injecting a liquid crystal by which the contamination degree of the liquid crystal injected into the cell is decreased in producing an LCD panel.

To achieve the above object, the method of injecting liquid crystal according to the present invention comprises the steps of:

adding ionic material captures for capturing ionic material, which increase the contamination degree of liquid crystal, into the liquid crystal contained in a liquid crystal tray having a contact coil formed at the upper part thereof, so as to purify the liquid crystal; and injecting the liquid crystal having been purified by the ionic material captures into a cell of a liquid crystal display panel.

It is preferred to make the ionic material captures function simultaneously to capture the ionic material which increases the contamination degree of the liquid crystal, and to transmit the liquid crystal instead of the contact coil, by adding ionic material captures, the particles of which are larger than the gap of a liquid crystal injection opening, into the liquid crystal.

BRIEF DESCRIPTION OF THE DRAWINGS

The object and other features and advantages of the present invention will become more apparent by describing the preferred embodiment thereof with reference to the accompanying drawings, in which:

FIG. 1 is a sectional view of an LCD panel for explaining a conventional method of injecting liquid crystal.

FIG. 2 is a sectional view of an LCD panel for explaining the method of injecting liquid crystal according to one embodiment of the present invention.

FIG. 3 is a plane view of the liquid crystal tray of FIG. 2.

FIG.4 is a sectional view taken along A—A line of FIG. 3.

FIG. 5 is a sectional view of an LCD panel for explaining the method of injecting liquid crystal according to another embodiment of the present invention.

DETAILED DESCRIPTION OF THE PREFERRED EMBODIMENTS

FIG. 2 is a sectional view of an LCD panel for explaining the method of injecting liquid crystal according to one embodiment of the present invention. Referring to FIG. 2, ionic material captures 7 are added to liquid crystal 3 contained in a liquid crystal tray 6 and the liquid crystal 3 purified by the capture 7 is then injected in a liquid crystal cell 4.

It is preferable that the ionic material captures 7 are composed of alumina, zeolite, carbon, ion-exchange resin, aluminum, nickel, iron-cobalt, etc. Also, the particle size of the ionic material captures 7 is within the range of 0.5 $\mu m$–500 $\mu m$.

As shown in FIGS. 2 to 4, the liquid crystal tray 6 used for the present method contains the liquid crystal 3, a contact coil 2 and the ionic material captures 7, and has shoulders 9 formed thereon to place a net 8 thereon for preventing the particles of the ionic material captures 7 from moving into the cell 4.

FIG. 5 is a sectional view of an LCD panel for explaining the liquid crystal injection method according to another embodiment of the present invention. In this embodiment, the contact coil 2 is removed from the liquid crystal tray 6a and the particle size of the ionic material captures 7 is determined to be larger than the gap of the liquid crystal injection opening so that the ionic material captures 7 perform the liquid crystal transfer instead of the contact coil 2. The net 8 has the shape of a cap and is formed so as to prevent the particles of the ionic material capture 7 from moving into the liquid crystal cell 4 as well as to make the liquid crystal injection opening in contact with the liquid crystal 3.

Hereinafter, the operation and effect of the present invention will be explained in detail.

Referring again to FIG. 2, the liquid crystal 3 filled in the lower portion of the liquid crystal tray 6 is refined by the ionic material capture 7 sucked therein and the refined liquid crystal 3 is injected into the cell 4 through the net 8 and the contact coil 2 placed on the shoulders 9 of the liquid crystal tray 6. In this embodiment, the meshes of the net 8 are made to be smaller than the particle size of the ionic material capture 7, preventing the ionic material capture 7 from moving into the liquid crystal cell 4.

As described above, the ionic material capture 7 is composed of alumina, zeolite, carbon, ion-exchange resin, aluminum, nickel or iron-cobalt compound and greatly restrain the liquid crystal from being polluted with ionic materials, resulting in that reduction of the specific resistance value of the liquid crystal 3 may be prevented.

Meanwhile, according to another embodiment of the present invention as shown in FIG. 5, the particle size of the ionic material captures 7 is determined to be larger than the gap of the liquid crystal injection opening and thus the ionic material captures 7 themselves serve as the contact coil 2 for transferring the liquid crystal, causing the contact coil 2 not to be required.

In the embodiment, the net S is formed to be cap-shaped and is closely contacted with and fixed on the upper portion of the liquid crystal tray 6a. As described above, the meshes of the net 8 prevent the particles of the ionic material captures 7 from moving into the LCD panel as well as make the liquid crystal injection hole in contact with the liquid crystal.

The particle size of the ionic material captures 7 as shown in FIG. 5 is determined to be larger than that of the ionic material captures 7 as shown in FIG. 2, but both ionic material captures 7 have the same compositions.

From the foregoing, according to the liquid crystal injection method of the present invention, the liquid crystal contained in the liquid crystal tray can be greatly restrained from being polluted with the ionic materials and thus the reduction of the specific resistance thereof may be prevented. Further, the number of liquid crystal injection times may be increased thereby improving the production efficiency of the LCD panel.

What is claimed is:

1. A method of injecting liquid crystal for producing a liquid crystal display panel comprising the steps of:
    adding ionic material captures for capturing ionic material which increases the contamination degree of the liquid crystal, into the liquid crystal contained in a liquid crystal tray having a contact coil formed at the upper part thereof, so as to purify the liquid crystal; and
    injecting the liquid crystal having been purified by said ionic material captures into a cell of a liquid crystal display panel.

2. A method of injecting liquid crystal for producing a liquid crystal display panel as claimed in claim 1 wherein said ionic material captures are composed of alumina, zeolite, carbon, aluminum, nickel, ion-exchange resin, and a compound of iron-cobalt.

3. A method of injecting liquid crystal for producing a liquid crystal display panel as claimed in claim 1 wherein the particle size of said ionic material captures is within the range of 0.5 $\mu$m to 500 $\mu$m.

4. A method of injecting liquid crystal for producing a liquid crystal display panel is claimed in claim 1 wherein said liquid crystal tray has shoulders formed at the interior thereof for mounting a net for preventing said ionic material captures from moving into the panel.

5. A method of injecting liquid crystal for producing a liquid crystal display panel as claimed in claim 4 wherein
    said net is formed in a shape of a cap and disposed such that said ionic material captures are prevented from passing into the panel and the liquid crystal is in contact with a liquid crystal injection opening of the panel.

6. A method of injecting liquid crystal for producing a liquid crystal display panel comprising the steps of:
    adding ionic material captures into liquid crystal contained in a liquid crystal tray so as to capture ionic material contained within the liquid crystal, wherein particles of said ionic material captures are larger than a gap of a liquid crystal injection opening;
    transmitting the liquid crystal to the liquid crystal injection opening by capillary action of the ionic material captures; and
    purifying the liquid crystal by injecting the liquid crystal through the gap in the injection opening and into a cell of a liquid crystal display panel, wherein the ionic material captures and captured ionic material are retained within the tray by reason of their size.

* * * * *